Aug. 16, 1949.　　　　L. L. SIMKINS　　　　2,479,186
VOLTAGE TESTER
Filed April 20, 1946
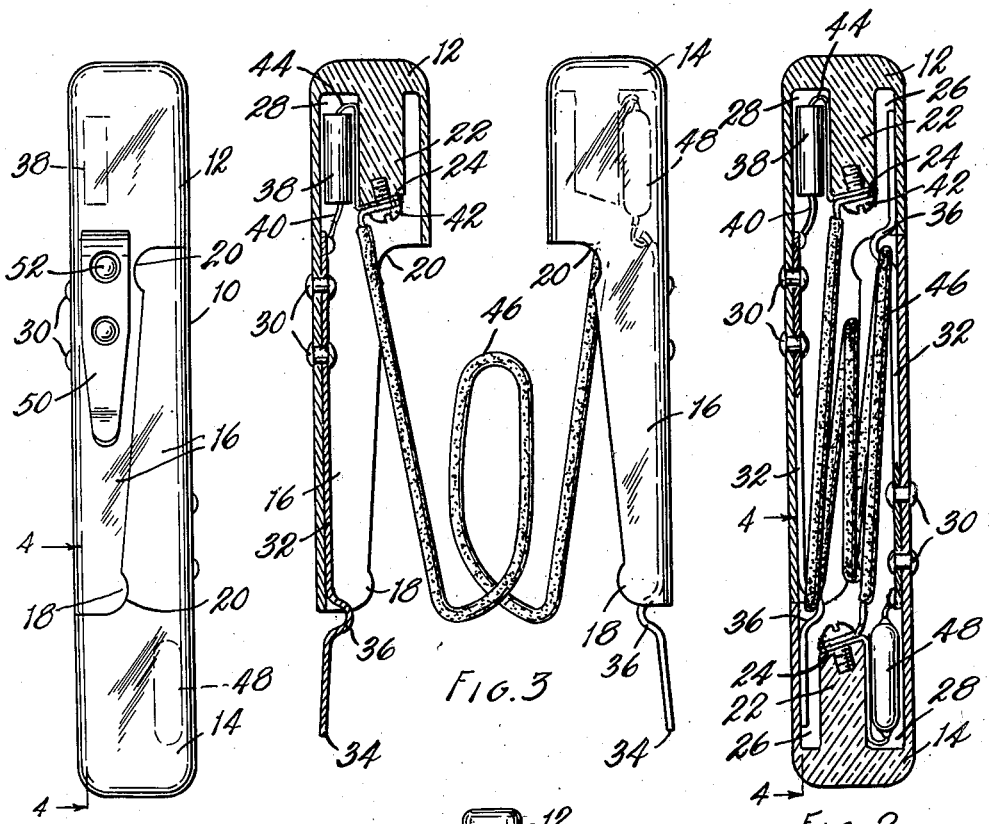
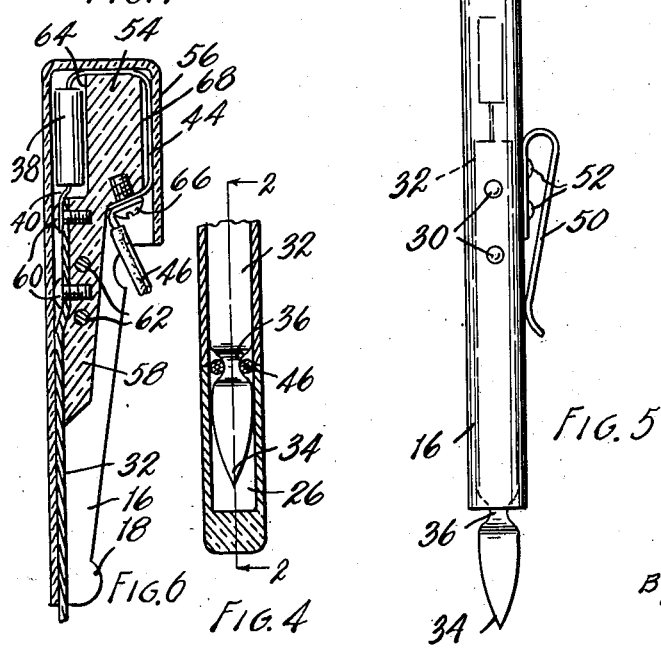
Inventor
Leon L. Simkins
By
Attorneys.

Patented Aug. 16, 1949

2,479,186

UNITED STATES PATENT OFFICE 2,479,186

VOLTAGE TESTER

Leon L. Simkins, Kalamazoo, Mich., assignor to The Wigginton Company, Kalamazoo, Mich.

Application April 20, 1946, Serial No. 663,695

11 Claims. (Cl. 175—183)

This invention relates to improvements in voltage tester.

The main objects of this invention are:

First, to provide a voltage tester the case of which forms insulating grip portions for using the tester.

Second, to provide a light, inexpensive case arranged to contain test points and connecting wires and indicating means when the tester is not in use.

Third, to provide a compact voltage tester which may be as conveniently carried as a fountain pen.

Other objects and advantages of this invention will be apparent from a consideration of the accompanying drawings, of which there is one sheet, and the following description and claims.

In the drawing which illustrates a preferred form and one modification of the invention, there is shown in Fig. 1 an elevational view of the voltage tester.

Fig. 2 is a view partially in longitudinal section on a line corresponding to line 2—2 of Fig. 4.

Fig. 3 illustrates the tester in open or operative position and is shown partially in longitudinal section.

Fig. 4 is a fragmentary view in section on a line corresponding to line 4—4 in Figs. 1 and 2 and looking in the direction of the arrows.

Fig. 5 represents an elevational side view of one-half of the tester in operative position.

Fig. 6 represents a cross sectional view similar to Fig. 3 and shows a modified form of the invention.

Voltage testers consisting of a pair of contact probes connected by a test lead and including some indicating means such as a lamp, have been used before to indicate the existence of a voltage between two spaced conductors.

However, these prior testers have been inconvenient and cumbersome in that the test probes and lead were either left free when not in use and thus became tangled or required a separate carrying case.

With the above disadvantages in mind, attention is called to Fig. 1 which illustrates at 10 the tester case generally. The case consists more specifically of an upper grip end 12 and a lower grip end 14 which are joined together by the interlocking center portions 16. It will be noted that the center portions are provided with the extended tips 18, having a reverse curved edge along the longitudinal axis of the tester, which are arranged to engage in notches 20 formed at the base of each center section next to its corresponding grip section.

The case 10 is generally hollow as indicated in Figs. 2 and 3, and attention is called to the fact that both the upper and lower grip ends are identical and may be formed of insulating plastic material from the same mould.

Within each grip is a partition 22 which is integrally formed with the case and is provided with an oblique end surface 24. The partition 22 divides the interior of the grip sections into two compartments, 26 and 28. Attached to each of the center sections 16 by means of insulating rivets 30 is a metallic test probe 32 which has a pointed end 34 extending beyond the end of each center section 16. A U-shaped bend is formed in each probe just at the end of the center sections of the case as at 36.

Positioned within the compartment 28 of the upper grip end 12 is a resistor 38 which is connected to the probe 32 by the conductor 40 and to a metal screw 42 by the conductor 44. The screw 42 is arranged to screw into the inclined face 24 of the partition 22 and to electrically connect one end of the test lead 46 to the conductor 44.

The lower grip end 14 of the tester is similarly provided with a testing probe 32 but has positioned in its compartment 28 a visual indicating device such as a neon tube 48. The neon tube 48 is connected similarly to the resistor 36 between the test probe 32 and the other end of the test lead 46.

From the above description and with a consideration of Fig. 2 it should be apparent that the pointed ends 34 of each test probe 32 may be inserted into the compartment 26 of the opposite grip end of the case from which they are attached. The probes 32 being secured to their center sections by the rivets 30 at some distance from the ends of the probes, may be sprung slightly to permit the two grip ends 12 and 14 to be pressed together until the extended tips 18 register with the notches 20 to prevent the two grip sections from being pulled longitudinally apart. The spring action of the metal probes 32 is sufficient to prevent the tip sections 18 from accidentally falling sideways out of the notches 20.

The U-bends 36 in the probes 32 are arranged to permit the test lead 46 to be wrapped around each probe, thus holding a portion of the test lead straight within the case and permitting easy coiling of a single loop of the test lead within the small space within the case.

A metallic pocket clip 50 is secured as by rivets 52 to the upper grip end 12 for conveniently carrying the tester in the pocket.

From the above it should be apparent that the tester provides an ample length of test lead between the two probes while at the same time conveniently enclosing both the test lead, the resistor and the neon light within the case when the tester is not in use.

In the modification shown in Fig. 6 the probes 32 are carried on insulating inserts 54 which are slid longitudinally into the grip ends 56, the partitions 24 of the first modification being omitted. Each insert 54 is provided with the longitudinally extending finger 58 to which the probe 32 is attached by means of screws 60. Other screws 62 extend transversely through the case to secure the insert in place. The insert 54 is cut away as at 64 to provide space for the resistor 38 or the neon tube 48, depending upon which end of the tester is being assembled. Similarly to the preferred form of the invention the resistor 38 is electrically connected between the probe 32 and the end of the test lead 46 which is held to the end of the insert by the screw 66. The insert 54 is further slotted as at 68 to permit the probe on the other grip to engage the side of the case when the case is closed.

The modified form of the invention permits the probes and inserts to be withdrawn from the grip ends of the case for convenience in replacement of either the resistor, the neon tube or the probes. In other respects the modified form of the invention operates the same as the preferred form.

I have illustrated and described a highly practical commercial embodiment of my invention. There has been no attempt to show other adaptations as it is believed that this disclosure will enable those skilled in the art to adapt the invention as may be desired.

Having described my invention, what I believe to be new is set out in the following claims:

1. A test instrument comprising a pair of separate insulating handles having extensions thereon, said extensions being arranged to engage each other whereby said handles and extensions form an enclosed case, metallic test probes secured one to each of said handles and extending beyond the ends of said extensions, a test lead connected between said test probes, and visual indicating means positioned within one of said handles and connected between the test probe thereon and said lead to be visible when said case is open.

2. An electrical testing instrument comprising a pair of hollow open end insulating grip sections each having an extended side portion arranged to engage with the other side portion to provide an enclosed case, metallic probes secured one to each side portion and extending beyond the ends thereof, a projection within each of said grip sections from the bottom thereof and defining a recess on each side of said projection, an electrical conductor secured at its ends to the top of said projections, U-shaped bends formed in said test probes near the ends thereof and arranged to guide said conductor, indicating means in one of said recesses in one of said grip sections electrically connected between one of said test probes and said conductor, and a resistor positioned within one of said recesses in the other of said grip sections and electrically connected between the other of said probes and said conductor, the end of one of said probes being arranged to fit in the other recess in the opposite grip section of said instrument when in folded position.

3. A test instrument comprising a pair of insulating handles having extensions along one side thereof and arranged to engage each other to form an enclosed case, tips on said extensions having a reverse curved edge with respect to the longitudinal axis of said handles, recesses at the base of said extensions arranged to receive said tips, metallic test probes secured to each of said extensions and extending beyond the ends thereof, and a test lead connected between said test probes.

4. An electrical test instrument comprising a closed generally cylindrical case divided into two like pieces along two longitudinally spaced transverse planes and a generally longitudinally extending plane with reverse surfaces at the ends thereof, metallic probes carried by each of said pieces and extending beyond the open ends thereof, U-shaped portions formed near the free ends of said probes, and a flexible conductor connected to said probes within the closed ends of said pieces.

5. An electrical test instrument comprising a closed generally cylindrical case divided into two like pieces along two longitudinally spaced transverse planes and a generally longitudinally extending plane with reverse surfaces at the ends thereof, an insert of insulating material positioned within the closed end of each of said pieces and having an extension projecting beyond the closed portion thereof, metallic probes secured to said extensions and extending beyond the open ends of said pieces, a resistor carried by one insert within the closed end of one of said pieces, a signal lamp carried on the other of said inserts within the closed end of the other of said pieces and a flexible conductor secured at its ends to said inserts at points within the closed ends of said pieces, said resistor and said signal lamp being electrically connected in series with said probes and said conductor.

6. An electrical test instrument comprising a closed generally cylindrical case divided into two like pieces along interlocking surfaces, insert members of insulating material positioned within the closed ends of each of said pieces and having portions extending toward the open ends of said pieces, said insert members being cut away on opposite sides thereof to form spaces within the closed ends of said pieces, metallic probes secured to the extending portions of said inserts and extending beyond the open ends of said pieces, a neon tube positioned in one of said spaces, a flexible conductor electrically connected between said probes, and in series with said neon tube, the ends of said probes being arranged to be positioned within two of said spaces within the ends of said pieces when said case is closed.

7. An electrical test instrument comprising a closed generally cylindrical case divided into two like pieces along two longitudinally spaced transverse planes and a generally longitudinally extending plane with reverse surfaces at the ends thereof, an insert of insulating material positioned within the closed end of each of said pieces and having an extension projecting beyond the closed portion thereof, screw means securing said inserts in said pieces, metallic probes secured to said extensions and extending beyond the ends of said pieces, a resistor carried by one insert within the closed end of one of said pieces, a signal lamp carried on the other of said inserts within the closed end of the other of said pieces and a flexible conductor secured at its ends to said inserts at points within the closed ends of said pieces, said resistor and said signal lamp being electrically connected in series with said probes and said conductor.

8. An electrical testing instrument comprising a pair of case members of insulating material each adapted as a handle and each having a chambered closed end and side portion of inwardly facing channel section, extending therefrom, the said side portions being complementary and adapted to fit together edge to edge to provide a closed case and having interengaging projections and recesses, probes of conducting springable material mounted longitudinally within the said side portions to project from the ends thereof for engagement with a part to be tested, each probe being springably engageable within the closed end portion of the other casing member when the casing members are in assembled relation for retaining the casing members in assembled relation, a resistor arranged in the chamber of one of the members, a signal lamp arranged in the chamber of the other member, said resistor and lamp being electrically connected to the probes of the casing members in which they are mounted, and a flexible test lead connecting said resistor and lamp, said probes having offsets therein adapted to receive coils of said lead to facilitate the arrangement thereof within the casing, the connections between said resistor, lamp and lead being accessible through the open ends of said chambers.

9. An electrical testing instrument comprising a pair of case members of insulating material each adapted as a handle and each having a chambered closed end and side portion of inwardly facing channel section extending therefrom, the said side portions being complementary and adapted to fit together edge to edge to provide a closed case and having interengaging projections and recesses, probes of conducting springable material mounted longitudinally within the said side portions to project from the ends thereof for engagement with a part to be tested, each probe being springably engageable within the closed end portion of the other casing member when the casing members are in assembled relation for retaining the casing members in assembled relation, a resistor arranged in the chamber of one of the members, a signal lamp arranged in the chamber of the other member, said resistor and lamp being electrically connected to the probes of the casing members in which they are mounted, and a flexible test lead connecting said resistor and lamp, the connections between said resistor, lamp and lead being accessible through the open ends of said chambers.

10. An electrical testing instrument comprising a pair of case members of insulating material each adapted as a handle and each having a chambered closed end and side portion of inwardly facing channel section, extending therefrom, the said side portions being complementary and adapted to fit together edge to edge to provide a closed case and having interengaging projections and recesses, probes of conducting springable material mounted longitudinally within the said side portions to project from the ends thereof for engagement with a part to be tested, each probe being springably engageable within the closed end portion of the other casing member when the casing members are in assembled relation for retaining the casing members in assembled relation, and a flexible test lead connecting said probes, said probes having offsets therein adapted to receive coils of said lead to facilitate the arrangement thereof within the casing.

11. An electrical testing instrument comprising a pair of case members of insulating material each adapted as a handle and each having a chambered closed end and side portion of inwardly facing channel section extending therefrom, the said side portions being complementary and adapted to fit together edge to edge to provide a closed case and having interengaging projections and recesses, probes of conducting springable material mounted longitudinally within the said side portions to project from the ends thereof for engagement with a part to be tested, each probe being springably engageable within the closed end portion of the other casing member when the casing members are in assembled relation for retaining the casing members in assembled relation, and a flexible test lead connecting said probes.

LEON L. SIMKINS.

REFERENCES CITED

The following references are of record in the file of this patent:

UNITED STATES PATENTS

| Number | Name | Date |
| --- | --- | --- |
| 1,615,788 | Feldkamp | Jan. 25, 1927 |
| 1,781,593 | Montapert | Nov. 11, 1930 |
| 2,023,916 | Dante | Dec. 10, 1935 |